G. W. MALCOLM & F. T. MUNTON.
TREATMENT OF BRINE.
APPLICATION FILED OCT. 26, 1908.
1,030,103.
Patented June 18, 1912.
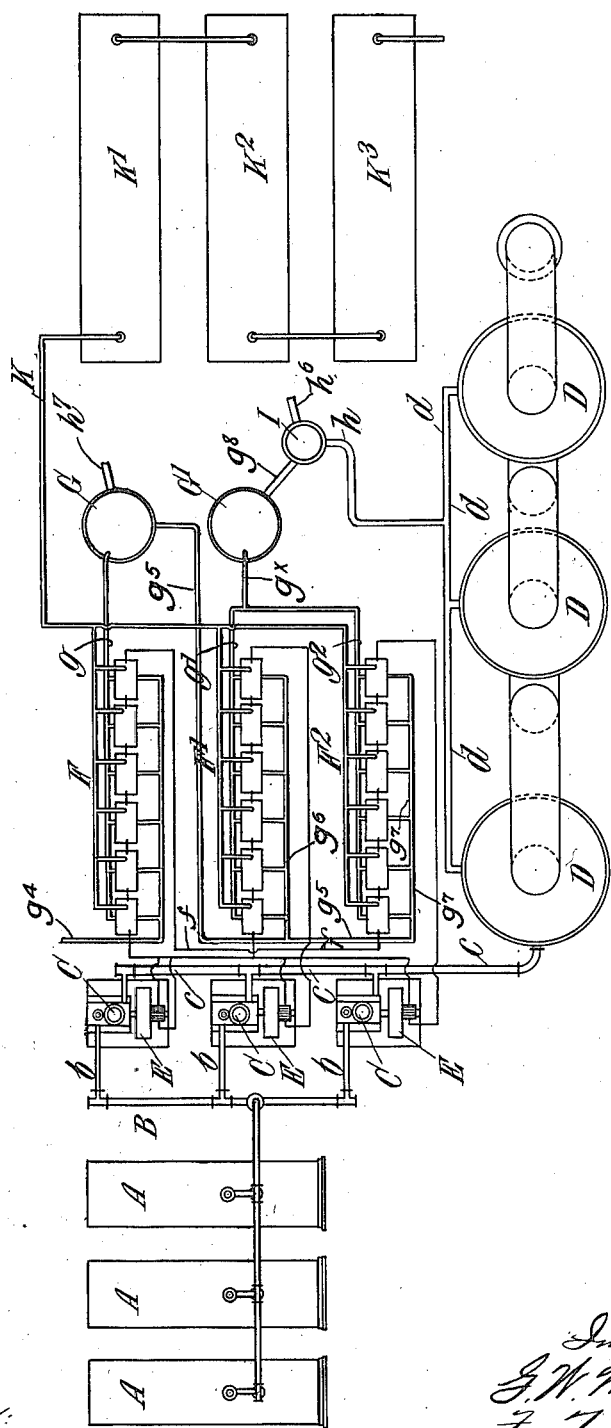

UNITED STATES PATENT OFFICE.

GEORGE W. MALCOLM, OF DAVENHAM, AND FREDERICK T. MUNTON, OF WINSFORD, ENGLAND, ASSIGNORS TO THE SALT UNION LIMITED, OF LIVERPOOL, ENGLAND.

TREATMENT OF BRINE.

1,030,103. Specification of Letters Patent. Patented June 18, 1912.

Application filed October 26, 1908. Serial No. 459,564.

*To all whom it may concern:*

Be it known that we, GEORGE WILLIAM MALCOLM and FREDERICK THOMAS MUNTON, both subjects of the King of Great Britain, residing, respectively, at Davenham, in the county of Chester, England, and The Oak House, Winsford, in the county of Chester, England, have invented certain new and useful Improvements in or Relating to the Treatment of Brine, of which the following is a specification.

This invention relates to the manufacture of salt from natural brine by the vacuum process of evaporation and has particular reference to a process in which the calcium and magnesium salts are removed before evaporation of the brine by electrolyzing the brine to form sufficient sodium hydrate to decompose the said salts and precipitate the magnesium and most of the calcium as hydrates and then treating the brine with carbonic acid to complete the removal of calcium, the chief object being to provide for the more economic production of the salt and to effect the recovery of certain of the by products separately for use in the arts.

According to the present invention the brine is subjected to a preliminary treatment in an eloctrolytic cell to secure the desired alkalinity, then treated for effecting the separation of the magnesium precipitate, subjected to further treatment in an electrolytic cell, and finally acted upon by gases containing carbon dioxid, which gases are passes through the brine to form sodium carbonate and effect the precipitation of the calcium carbonate. Further the power for driving the engines for working the dynamos employed in generating the current for use in the electrolyzing step above referred to is derived from the steam which, at present, is used for evaporating purposes only and to a small extent for driving the air and other pumps, which are indispensable accessories to a vacuum plant, and the exhaust from such engines, which may be superheated, is passed directly to the vacuum plant to furnish the heat necessary for effecting the evaporation of the brine.

In order that the said invention may be clearly understood and readily carried into effect, we will proceed to describe the same more fully with reference to the accompanying drawing in which we have represented diagrammatically a plant adapted to accomplish the manufacture of salt according to this invention.

In the plant illustrated in this drawing, A, A, A are steam generators for producing high pressure steam which passes, by way of the pipe B and branch pipes $b$, $b$, $b$ to the respective non-condensing engine C, C, C, the exhaust steam from these engines being conveyed by a pipe $c$ to the evaporating pans D, D, D. The engines C, C, C, are arranged to drive electric generators E, E, E whereby electric current is supplied to electrolyzing cells of any suitable type such as F', $F^2$, $F^3$.

The current is conducted to the cells by way of the leads $f$ $f$ the arrangement of these leads admitting of the connection of any one of the dynamos with any series of cells. Brine is supplied to the cells by hand or by any other convenient means and is electrolyzed therein, caustic soda being produced. It will be seen on reference to the diagram that the cells F are in communication, by way of a pipe $g$ with a separator G while the cells F' and $F^2$ are in communication with another separator G' by way of pipes $g'$ $g^2$ and a branch pipe $g^x$ which is common to both the pipes $g'$ $g^2$. Raw brine is introduced into the cells F by the pipe $g^4$ and is there partially electrolyzed. The current is so regulated that sufficient caustic soda is produced to precipitate all the magnesium salts which are separated from the brine. The clear partially purified brine is now led from the separator G through the pipe $g^5$, $g^6$, $g^7$ to be further electrolyzed in the cells F' $F^2$. In these cells sufficient caustic soda is formed to combine with the calcium salts present in the brine when subjected to carbon dioxid gas. The treated brine then flows by pipes $g'$, $g^2$, $g^x$ to the carbonator G' where washed flue gases are forced through the alkaline brine. The calcium salts are precipitated as calcium carbonate, and are separated in the separator I. The brine thus purified and freed from magnesium and calcium salts is now conducted by way of the pipe $h$ to the distributing pipe $d$ and thence to the evaporating pans D for the production of salt in the well known manner of vacuum evaporation.

The calcium carbonate may be drawn off from the separator I through the pipe $h^6$ and the magnesium compounds may be drawn off from a separator G through the pipe $h^7$, or by other suitable means. The chlorin which results from the electrolysis of the brine in the cells F, F', $F^2$ may be collected by the pipes $k$ and conducted by way of the pipe K to the chlorinating chambers K', $K^2$, $K^3$ where bleaching powder may be manufactured in the well known manner by absorbing the chlorin by means of lime.

It will be seen that, after the preliminary electrolysis of the brine, adapted to secure the desired alkalinity, by the hereinbefore described further treatment, suitable for the purpose, the magnesium precipitate is effectually separated from the brine, and rendered available for treatment by any convenient means whereby the same may be converted into a commercial article further, that, by the action of the flue gases from the steam generators the gases being passed through the further treated and partially purified brine, the carbon dioxid in the said gases combines with the caustic soda forming sodium carbonate, calcium carbonate is precipitated and the equivalent of sodium sulfate left in the brine solution. This latter will be found quite harmless from the point of view of evaporation, and, moreover, will be present in quite a negligible quantity. As a by product bleaching powder is produced by the use of the saturating chambers wherein the absorption by lime of the chlorin evolved from the electrolytic process is accomplished. The cycle of operations is, therefore, by means of the steam, to first drive the engines and the current generating plant; the exhaust steam from the engines is passed by means of pipes or other conduits to the vacuum plant where it effects the evaporation and the making of the salt from the previously electrolyzed and purified brine, which is led into the evaporating pans. The resultant by products are treated in any known manner to convert or render the same into commercial commodities for use in the arts; thus the process may be carried on continuously and with great economy and profit.

By the various steps in the above described electrolysis, the magnesium and the calcium salts are effectually separated in the pure state as they are thrown down in different periods of the process.

What we claim and desire to secure by Letters Patent of the United States is:—

1. In the manufacture of salt from natural brine by the vacuum process of evaporation, the herein described method of carrying on the said process continuously consisting in subjecting the brine to a preliminary treatment in an electrolytic cell so as to secure the desired alkalinity, separating the magnesium precipitate from the brine, subjecting the brine to a further treatment in an electrolytic cell, passing gases containing carbon dioxid through the brine to form sodium carbonate and effect the precipitation of calcium salts thereby leaving the equivalent of sodium salts in solution, and separating the purified brine by exhaust steam from the engines.

2. The process of purifying brine consisting in electrolyzing the brine to an extent sufficient to precipitate the magnesium salts then effecting the precipitation of the calcium salts by treating the remaining brine solution with gases containing carbon dioxid, then conducting the purified brine to the evaporating pans which are heated by the exhaust steam from the engines.

3. In the continuous process of manufacturing salt from natural brine by the vacuum evaporation process the method of purifying the brine and successively eliminating the magnesium and calcium salts therefrom, consisting in causticizing the brine by electrolysis, separating the magnesium hydrate formed thereby, then treating the brine solution with gases containing carbon dioxid to precipitate the calcium salts, sodium sulfate being left in solution and finally conducting the purified brine to the evaporating pans which are heated by exhaust steam from the engines.

In testimony whereof we affix our signatures in presence of two witnesses.

GEO. W. MALCOLM.
F. T. MUNTON.

Witnesses:
CLARENCE H. WIMSHURST,
RICHARD H. PHILLIPS.